United States Patent [19]

Jönsson

[11] Patent Number: 4,809,259
[45] Date of Patent: Feb. 28, 1989

[54] ARRANGEMENT FOR ESTABLISHING WIDE BAND CONNECTION IN A SWITCHING NETWORK

[75] Inventor: Stig R. E. Jönsson, Stockholm, Sweden

[73] Assignee: Telefonaktiebolaget L M Ericsson, Stockholm, Sweden

[21] Appl. No.: 33,086
[22] PCT Filed: Jun. 2, 1986
[86] PCT No.: PCT/SE86/00256
 § 371 Date: Feb. 18, 1987
 § 102(e) Date: Feb. 18, 1987
[87] PCT Pub. No.: WO86/07661
 PCT Pub. Date: Dec. 31, 1986

[30] Foreign Application Priority Data

Jun. 20, 1985 [SE] Sweden ................................ 8503112

[51] Int. Cl.⁴ ........................................... H04Q 11/04
[52] U.S. Cl. ........................................ 370/58; 370/100
[58] Field of Search ................... 370/110.1, 105, 68.1, 370/58, 100, 13

[56] References Cited

U.S. PATENT DOCUMENTS 4,154,984  5/1979  Murason .......................... 370/105
4,500,991  2/1985  Lubcke et al. ................... 370/105
4,543,652  9/1985  Amada et al. ..................... 370/58

FOREIGN PATENT DOCUMENTS 0119843  9/1984  European Pat. Off. .

Primary Examiner—Douglas W. Olms
Attorney, Agent, or Firm—Burns, Doane, Swecker & Mathis

[57] ABSTRACT

Telecommunication equipment operating with pulse code modulation and time division multiplexing includes a switching network in which a wide band connection consisting of two or more channels is to be through-connected. A marking device (M) is disposed at the switching network input, and provides markings of the respective contents in the time slots utilized by the connection channels. A scanning device (AO) is arranged at the output of the switching network for detecting a pattern formed by said markings, and with the aid of it determining a possible relative mutual delay between the respective contents of the channels. The scanning device regulates an equalizing device (UO) which equalizes delays in the channels such as to ensure that after the connection establishment stage the contents of the channels/time slots regain their mutually synchronized positions in spite of the possible mutually relative delay.

7 Claims, 2 Drawing Sheets

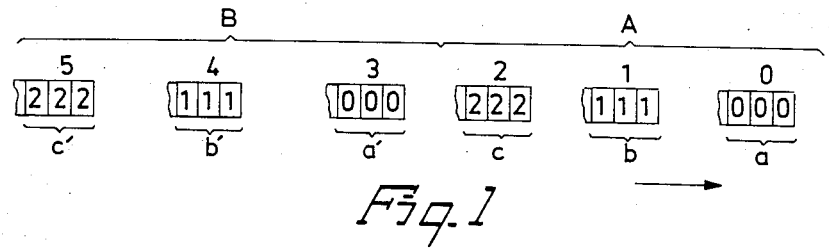
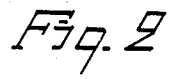
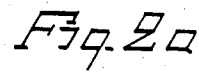
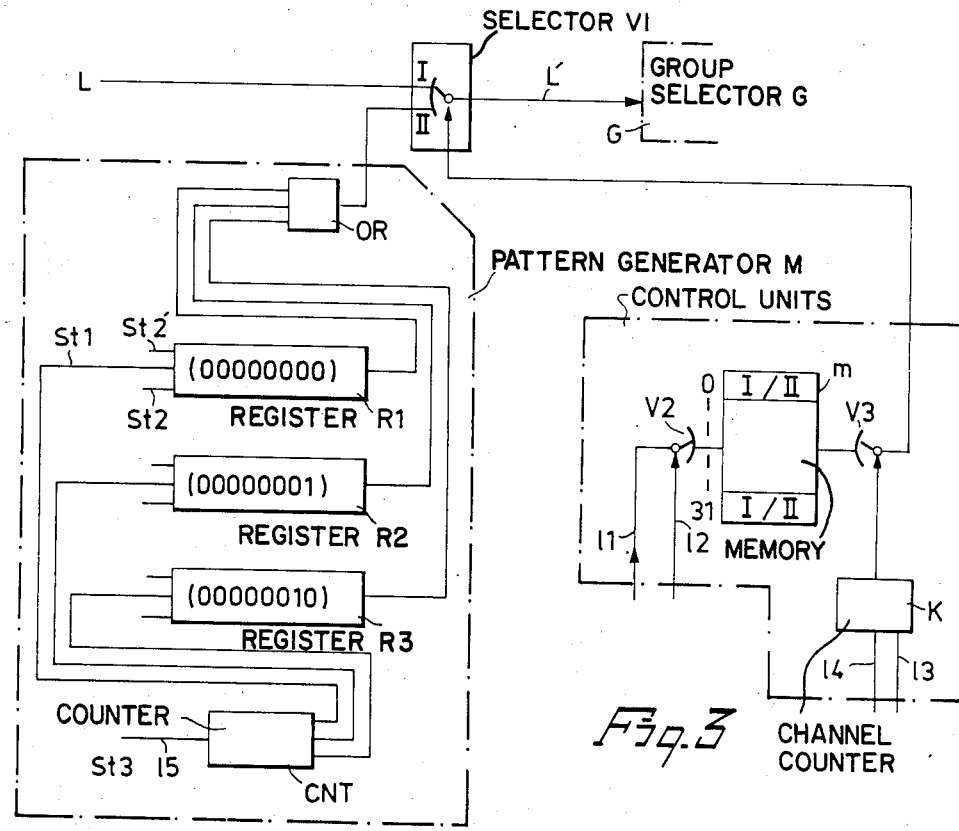

ARRANGEMENT FOR ESTABLISHING WIDE BAND CONNECTION IN A SWITCHING NETWORK

TECHNICAL FIELD

The present invention relates to an arrangement for establishing a wide band connection in a switching network in telecommunication equipment operating with pulse code modulation and time division multiplexing, where the connection comprises two or more channels.

BACKGROUND ART

The invention is intended for use in telecommunication systems which divide the bit flow up into a plurality of channels for a predetermined number of bits, e.g. 64 kbit channels, which applies to such as the AXE type of system.

In such systems is a need of being able to establish high quality connections, e.g. connections for video transmission. This means, inter alia that a sampling rate must be enabled which is higher than that applicable to the basic system.

The problem is solved by two or more channels being combined and thus creating a so-called wide band connection. Such channels which form a wide band connection must be monitored on establishing communication in the switching network so that the respective contents/samples are not mutually delayed, since there is distortion in the transmitted information if this delay takes place.

For solving this problem it would be possible to modify the group selector (switching network in the respective station/exchange, where its modification would mean that the selection of internal time slots must be controlled for the wide band connection.

The time slots must then be selected so that writing into/reading from the speech memories of the channels included in the connections is carried out with the information kept together. Such a modification can be performed entirely in the software.

DISCLOSURE OF INVENTION

The solution proposed above also involves large disadvantages, however, since the internal time slots cannot be at free disposal, which causes the probability of congestion to increase. The probability of congestion also appears to be dependent on the mutual relationship of incoming and outgoing time slots. The increased probability of congestion will thus extend the mean connection time.

An alternative way of solving the problem mentioned is that when local or transit nodes are through-connected, a possible mutual delay is allowed to take place, due to the transfer between external and internal time slots, and to equalise the possible delay between the contents of the channels after the through connection has been completed in the switching network.

The invention comes to grips with this complex problem and proposes that during a connection establishment stage the switching network input is supplied with specific information as to the respective phase position of the channel contents, and that at the output of the network this specific information is detected and delays are regulated in means for equalising the contents of the channels.

What may be more concretely considered as characterizing for the new arrangement is, inter alia, that a marking means is disposed at the switching network input such that during a connection establishment stage the means applies markings in a plurality of successive frames of the respective contents in the time slots utilized by the connection channels, and that a scanning means is disposed at the output of the switching network such that the scanning means detects a pattern formed by said markings, and with the aid of it determines a possible delay between the respective contents of the channels, due to the through connection process in the switching network. A further characterizing feature is that scanning means controls delay equilising means in the channels so that the equalising means ensures that, after the connection establishment stage, the contents of the channels/time slots regain their mutually synchronized positions in spite of the possible, mutual delay.

In a preferred embodiment, the content in each affected time slot in a first frame is assigned a first marking, the content in each affected time slot in a second frame a second marking, and so on. The number of frames marked thus is selected such that it is equal to a number of frames corresponding to a maximum difference in the time displacement in the switching network, reckoned as a number of frames plus the constant two. A group with the mentioned number of frames is followed by a corresponding group of frames where the marking of the contents in the different time slots is carried out in a corresponding manner.

The aforementioned means preferably includes a means carrying out the markings in the respective frame and adapted such that in response to a comparison it feeds instructions to a memory included in said equalising means. The equalising means may include two or more parallel paths for the bit flow departing from the switching network. The first of said paths lacks delay, the second delays the bit flow a frame length, the third delays the bit flow two frame lengths, and so on. The equalising means guides the contents in the channels into different paths in response to the instructions obtained from the comparison means.

With the aid of the inventive arrangement wide band connections can be established without the respective group selector/switching network needing to be modified for the connection in question. The equipment required for marking, detection of the marking and establishment of the connection can be assigned to the wide band connection as such, which may be advantageous for determining the cost carriers within the system.

BRIEF DESCRIPTION OF DRAWINGS

An embodiment of an arrangement proposed at present, which has the significant characterizing features of the invention, will now be described below and with reference to the accompanying drawings where FIG. 1 illustrates the principle of marking the content in channels/time slots in a plurality of successive frames, FIG. 2 is a table (a pattern) of the marking of frames and channels on the input side of a switching network/group selector, FIG. 2a is a table (a pattern) of the markings of the frames and channels on the output side of the switching network/group selector, FIG. 3 is a principle sketch illustrating the means carrying out the markings disposed at the input of the switching network (group selector)

BEST MODE FOR CARRYING OUT THE INVENTION

Figure 4:
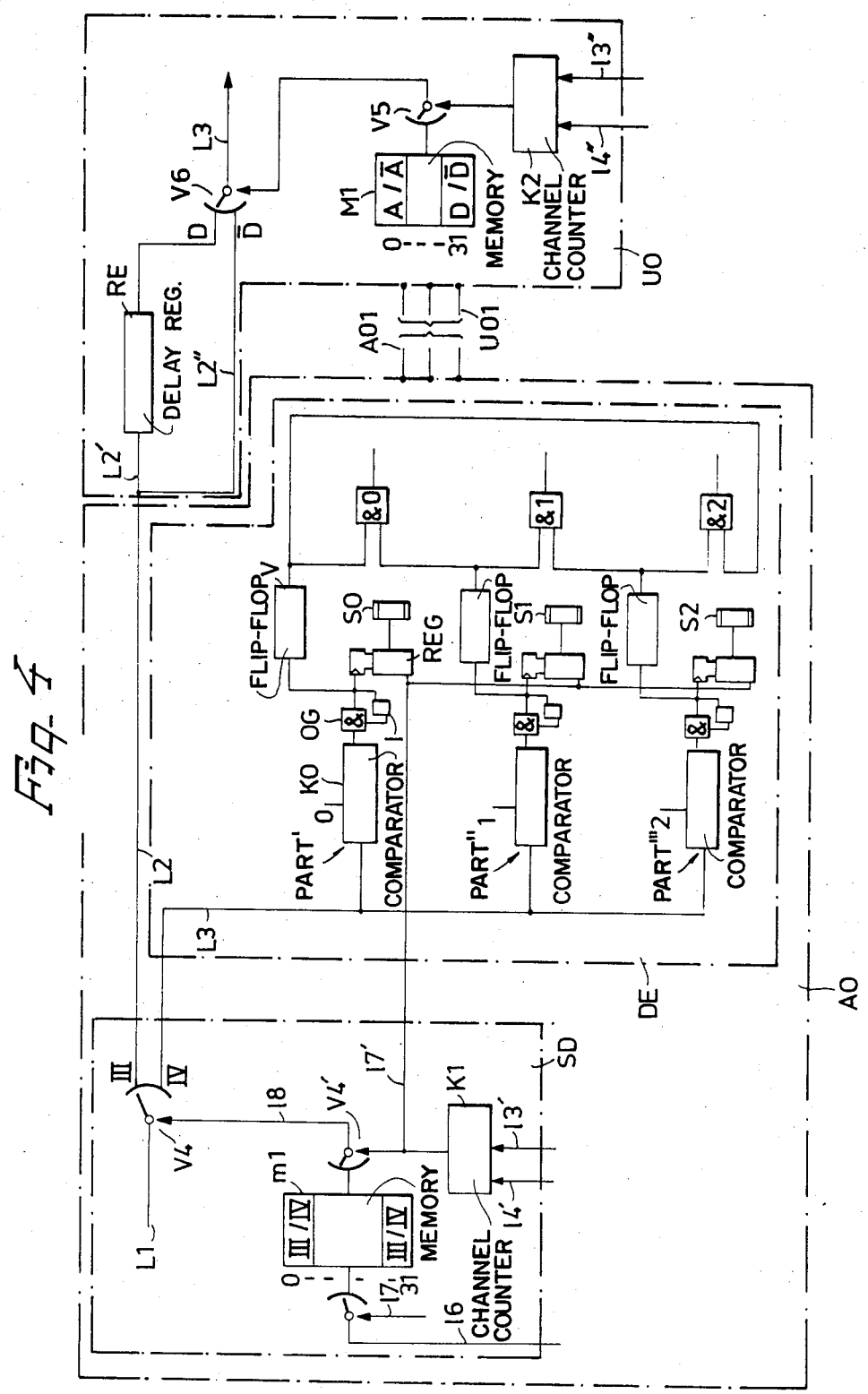
FIG. 4 illustrates detection means for detecting the markings and means delays in the channels.

The invention is intended for use in through connection of wide band connections in group selectors or corresponding units associated with telecommunication equipment working with pulse code modulation and time division multiplexing. The telecommunication equipment can be of the AXE type, which divides the bit flow into 64 kbit channels with the sampling frequency of 8000 samplings/s with 8 bits in 256-bit frames.

FIG. 1 illustrates six such sequential frames 0–5 in series one after the other in a connection not illustrated in the figure, to a group selector or corresponding unit.

In accordance with the invention, the contents in the time slots which are used as channels in the wide band connection are marked on the input side of the group selector. In the embodiment it has been assumed that three channels are included in a wide band connection. The three time slots utilized in these three channels have been marked with a, b and c in a first group of frames A, and with a', b' and c' in a second group B.

The respective three time slots in respective frames 0–5 have been shown placed adjacent each other, although the time slots can be spread within the respective frame.

The time slots a in frame 0 are marked identically the same and the marking consists in the present case of the binary value 0 which is illustrated with the numeral value 0 in FIG. 1, for the sake of simplicity. The slots b in the frame 1 are marked in a corresponding manner with the binary value 1 and the time slots c in the frame 2 with the binary value 2.

The time slots a' in the frame 3 are marked as is the time slot a in frame 0. The time slot b' in frame 4 is marked as is the time slot b in frame 1 and the time slot c' in frame 5 as is the time slot c in frame 2.

The number of individual markings, i.e. the number of frames within the respective group A, B is dependent on the maximum difference in time displacement which can occur in the group selector (switching network) reckoned as a number of frames. The number of individual markings is thus equal to the maximum displacement plus a constant 2. Since the contents in the three channels in the AXE-type system may be mutually delayed by at most one frame there is obtained a plurality of individual markings, which will be three in the present case.

The number of groups A, B is dependent on how long a time it takes to determine the mutual difference. The groups of frames consecutive to the group B in FIG. 1 have corresponding structure and marking as the groups A and B.

FIG. 2 illustrates in the form of a table the marking/pattern according to FIG. 1, i.e. how the marking appears on the input side of the group selector. In the table the frames have denotations corresponding to the frames in FIG. 1. The channels utilizing the time slot in a, b, c etc. have been given the denotations 0', 1', 2' in the table.

FIG. 2a illustrates how the content in the channel 1' is delayed in relation to the contents in the channels 0' and 2'. The delay here is dependent on the junction between external and internal time slots in conjunction with the through connection in the group selector. This means that the contents in the channels 0' and 2' must be delayed a frame length before the bit flow is sent further to the outgoing line.

According to FIG. 3, the bit flow comes from the line L. Marking of the content in the respective channel/time slot takes place with the aid of a pattern generator M and a selector V1 which is controllable with the aid of a control unit S. The selector V1 connects the line L to the group selector G via L', and in response to orders from the control unit it can temporarily connect the pattern generator for marking the content in the respective affected time slots.

The control unit includes a memory m, into which the prerequisites for the operational mode of the control unit are written from an unillustrated superior unit. Writing takes place via a conductor $l_1$ and addressing to the different cells (0–31) with the aid of the selector means V2 controlled via $l_2$. There are two control orders: order I "Collect from the line" and order 2 "Collect pattern".

The control order stored in the memory m are read with the aid of a channel counter K, counting between 0–31 and controlled by a 256 kHz signal via $l_3$ and a synchronizing signal of 8 kHz via the line $l_4$. Actual reading from the memory m is done by the selector means V3.

The pattern generator M includes registers R1, R2 and R3, the outputs of which are connected to an OR gate OR, the output of which is connected to position 2 in the selector means V1. The respective register generates the markings 0, 1 and 2, in binary form.

The respective register has two control inputs st1 and st2. The first input is controlled by a counter CNT which, in response to control from the frame synchronization of 8 kHz via st3 activates the respective register. The control input st2 obtains a clock pulse of 256 kHz from a clock pulse source in the telecommunication equipment and control input ST2' obtains a clock pulse of 2048 kHz from the same source.

In FIG. 4 there is illustrated a reading means A0, which detects a pattern formed by said markings, and with the aid of the pattern determines the possible delay between the contents of the channels.

The means A0 includes a control part SD a detection part DE, a selector means V4 and a memory m1, in which are written the orders from a superior unit, these orders applying to the selector means V4. The latter has two order positions: position 3 which is a normal position, and position 4 which is a position for analyzing delayed time slots (channels).

Writing into the memory m1 takes place via a line $l_6$ and addressing to the cells 0–31 via a line $l_7$. Time slot control is obtained from said superior unit. Reading out from the memory m1 is controlled from the channel counter K1 via the lines $l_3'$, $l_4'$ in a corresponding way as the memory m is controlled from the channel counter K. Read out from the memory m1 for control of the selector means V4 takes place via a selector means V4', and a line $l_8$.

The detection part comprises a plurality of identically implemented parts Part', Part", Part ''' the number of which corresponds to the number of patterns used.

The respective part includes a comparator K0. The output of the respective comparator is connected to an AND gate 0G, the other input of which is connected to an inverting means I loopconnected from the AND gate output. There is further included a register REG, the output of which is connected to its respective memory S0, S1 or S2. The respective output on the AND gate 0G is connected to both the register REG and a flipflop V. An input on the respective register REG is also connected to the output on the channel counter K1.

The respective one of said identically implemented parts is adapted for reacting to its individual marking. Accordingly, the Part' reacts for the marking 0, the Part" for the marking 1 and the Part'" for the marking 2.

The output from the respective flipflop V in the parts Part' and Part" is connected to an AND gate &0, the output from the respective flipflop V in Part" and Part'" to an AND gate &1 and the output on the respective flipflop in Part'" and Part' to an AND gate &2.

In accordance with the example in FIG. 2a there is obtained a pattern 0, 2, 0 from the scanned frame. The comparator K0 in Part' reacts for the marking 0 in the time slot zero, resulting in that the flipflop V in part' is set, and that the channel address for the time slot in question is written into (stored in) the memory S0. The comparator in Part'" reacts for the marking 2 in time slot 1, resulting in that the flipflop V is set in Part'", and that the channel address for the time slot in question is written into (stored in) the memory S2. What has now been said signifies that the AND gate &2 sets its output to a One. The comparator in Part' reacts for the marking zero in the time slot 2 and the channel address for this time slot is also written into (stored in) the memory S0.

A first order or instruction is thus delivered from the outputs of the AND gates &0, &1 and &2. Other One settings of the AND gate outputs result in different outgoing instructions, etc.

FIG. 4 also illustrates a means UO equalising delays in affected channels. The means UO includes a memory M1, which receives the instructions from the means AO. The instructions in the memory M1 are read out with the aid of selector means V5 which is controlled by a channel counter K2, in turn controlled in a corresponding manner as is the channel counter K via lines l₃" and l₄".

The means UO includes selector means V6 with order positions D and $\bar{D}$. The line coming from the group selector is denoted by L1 in the Figure. The selector means V4 normally directs the bit flow to the line L2, but in the cases where marked channels are to be identified towards the line L3, it directs the bit flow to said detection means AO.

The line L2 branches into line paths L2' and L2". A register RE comprising a 256 bit register of a known kind is linked into the line part L2'. The selector means V6 connects the line L3 to one of the paths L2' and L2" decided by the means UO.

The instructions from the output AO1 formed in the means AO are transferred to the memory M1 (the input UO1) in a known manner, e.g. with the aid of a known control system. In accordance with the above there are written into the memory M1 the instructions set forth below, in response to what was obtained on the outputs AO₁, (the outputs &0–&2 of the AND gates).

If all the AND gates &0&2 are set to zero, the order $\bar{D}$ (i.e. no delay), is written into the memory M1 for all the affected channels, the addresses of which are written into store in S0, S1 or S2. If the gate &0 is set to One, D is written into the memory M1 for all channels having addresses registered in the memory S1, and $\bar{D}$ for all channels having addresses registered in the memory S0. If the gate &1 is set to One, D is written into the memory M1 for all channels having addresses written in the memory S2, and $\bar{D}$ for all channels having addresses written into the memory S1. Finally, when only the gate &2 is set to One, the order D is written into the memory M1 for all channels having addresses written into the memory S0 and $\bar{D}$ for all channels having addresses written into the memory S2.

It will be seen from the above that what is delayed is only the content of the respective channel included in the wide band connection since the contents of remaining time slots in the respective frame are shunted via the order position $\bar{D}$.

After generation of instructions to the memrory M1, the wide band connection is made and subsequent frames will be guided in the line paths determined by the memory M1 past and/or through the delay register RE, which delays the bit flow controlled via the line path L2' by one frame length.

The equipment described hereinbefore is suitably included in terminal equipment in connection with the group selector network. The terminal equipment is duplicated in the case where two-way paths are to be established through the switching network.

The invention is not limited to what has been described hereinbefore and exemplified by the embodiment, but may be subject to modifications within the scope of the following claims and the inventive concept.

I claim:

1. Arrangement for establishing a wide band connection in a switching network (G) in telecommunication equipment operating with pulse code modulation and time division multi-plexing, where the connection comprises two or more channels, characterized in that a marking means (M) is disposed at the switching network input such that, during a connection establishment stage, the means achieves markings in a plurality of successive frames of the respective contents in the time slots utilized by the connection channels, and that the marking means (M) assigns to the content in each affected time slot in a first frame a first marking, the content in each affected time slot in a second frame a second marking, and so on, until the number of such successive frames is equal to a maximum time displacement in the switching network, this displacement corresponding to a number of frames plus a constant and that a scanning means (A0) is disposed at the output of the switching network, such that the scanning means detects a pattern formed by said markings and by means of said pattern confirms a possible delay between the respective contents of the channels, due to the connection process in the switching network, and in that the scanning means (A0) controls a means (U0), which equalises delays in the channels such as to ensure that, after the connection establishment stage, the contents of the channels/time slots regain their mutually synchronized positions, in spite of the possible, mutually delay.

2. Arrangement as claimed in claim 1, characterized in that the number of frames corresponding to the maximum displacement in the switching network plus said constant forms a first group (A) of frames which is followed by a corresponding second group (B) of frames, and so on.

3. Arrangement as claimed in claim 1, characterized in that the marking means (M) assigns the contents in affected time slots the same markings in the different groups of frames.

4. Arrangement as claimed in claim 1, characterized in that the scanning means (A0) includes a comparing means (K0) comparing the markings in the respective frames, said comparison means (K0) being adapted to feed instructions in response to the comparison to a memory (M1) included in the equalizing means (U0).

5. Arrangement as claimed in claim 4, characterized in that the equalising means (U0) includes two parallel paths (L2', L2") for the bit flow, of said paths the first (L2") lacks delay and the second (L2') delays the bit flow one frame length, and in that equalising means (U0) is disposed for guiding said channel contents into different paths (L2', L2"), in response to said instructions.

6. Arrangement as claimed in claim 1, characterized in that the scanning means (A0) includes parts (Part', Part", Part"') to which are assigned their respective individual markings, in that the parts control a gate network (&0-&2) and in that instructions to said equalising means (U0) are generated at the outputs of the gate network.

7. Arrangement as claimed in claim 6, characterized in that the instructions on the outputs of the gate network are conventionally transferable to a memory (M1) in the equalising means (U0) together with channel addresses, which are storable in memories (S0, S1, S2) included in the respective parts (Part', Part", Part"').

* * * * *